United States Patent
Yang et al.

(10) Patent No.: US 11,326,011 B2
(45) Date of Patent: May 10, 2022

(54) AQUEOUS POLYMER DISPERSION AND PROCESS OF MAKING THE SAME

(71) Applicant: Dow Global Technologies LLC, Midland, MI (US)

(72) Inventors: Xiaohong Yang, Shanghai (CN); Yan Wu, Shanghai (CN); Yawei Xu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 16 days.

(21) Appl. No.: 16/349,634

(22) PCT Filed: Dec. 28, 2016

(86) PCT No.: PCT/CN2016/112553
§ 371 (c)(1),
(2) Date: May 14, 2019

(87) PCT Pub. No.: WO2018/119721
PCT Pub. Date: Jul. 5, 2018

(65) Prior Publication Data
US 2019/0345283 A1  Nov. 14, 2019

(51) Int. Cl.

| | | |
|---|---|---|
| *C08F 265/06* | (2006.01) | |
| *C08F 2/00* | (2006.01) | |
| *C08F 2/16* | (2006.01) | |
| *C08F 220/14* | (2006.01) | |
| *C09D 133/08* | (2006.01) | |
| *C09D 143/04* | (2006.01) | |
| *C09D 151/00* | (2006.01) | |
| *C08F 220/18* | (2006.01) | |
| *C08F 230/08* | (2006.01) | |

(52) U.S. Cl.
CPC ............ *C08F 265/06* (2013.01); *C08F 2/001* (2013.01); *C08F 2/16* (2013.01); *C08F 220/14* (2013.01); *C09D 133/08* (2013.01); *C09D 143/04* (2013.01); *C09D 151/003* (2013.01); *C08F 220/1804* (2020.02); *C08F 220/1808* (2020.02); *C08F 230/085* (2020.02)

(58) Field of Classification Search
CPC combination set(s) only.
See application file for complete search history.

(56) References Cited

U.S. PATENT DOCUMENTS

| | | | |
|---|---|---|---|
| 4,654,397 A * | 3/1987 | Mueller-Mall | C08F 285/00 524/460 |
| 7,208,544 B2 | 4/2007 | Kawase et al. | |
| 7,247,672 B2 | 7/2007 | Tamazawa | |
| 7,772,342 B2 | 8/2010 | Tamazawa | |
| 10,487,166 B2 * | 11/2019 | Yang | C08F 265/06 |
| 2009/0035587 A1 | 2/2009 | Killilea et al. | |
| 2011/0023945 A1 | 2/2011 | Hayashi et al. | |
| 2013/0172483 A1 * | 7/2013 | Roller | C08L 33/14 524/809 |
| 2013/0183361 A1 * | 7/2013 | Tamareselvy | D06M 15/263 424/401 |
| 2016/0244629 A1 | 8/2016 | Xu et al. | |

FOREIGN PATENT DOCUMENTS

| | | | |
|---|---|---|---|
| CN | 102803420 B | 6/2015 | |
| CN | 105603781 A * | 5/2016 | |
| EP | 0619341 A1 * | 10/1994 | ............... C08K 5/25 |
| WO | 2010019825 A2 | 2/2010 | |
| WO | 2014190515 A1 | 12/2014 | |
| WO | WO-2015042020 A1 * | 3/2015 | ............ A61K 8/8158 |
| WO | WO-2015071590 A1 * | 5/2015 | ............ C08L 51/003 |

OTHER PUBLICATIONS

P. Peyser; Glass Transition of Temperatures of Polymers; Naval Research Laboratory Washington DC; VI 215/227.
Leo, Albert J.; Chemical Reviews; vol. 93, Issue No. 4; Jun. 1993; pp. 1281-1306.

* cited by examiner

*Primary Examiner* — Nicole M. Buie-Hatcher
(74) *Attorney, Agent, or Firm* — Karl E. Stauss; Cantor Colburn LLP

(57) ABSTRACT

An aqueous dispersion of a multistage polymer and an aqueous coating composition comprising the aqueous dispersion and providing coating films with good scratch resistance and balanced properties.

15 Claims, No Drawings

AQUEOUS POLYMER DISPERSION AND PROCESS OF MAKING THE SAME

FIELD OF THE INVENTION

The present invention relates to an aqueous polymer dispersion and a process of making the same.

INTRODUCTION

Scratch resistance is one of critical properties for top coats in many coating applications, such as wood coatings. Top coats need to expose to different environments and tend to be scratched when touched by sharp or hard objects. Scratches not only greatly reduce the surface aesthetics of a coated product but may lead to premature coating failure. Wood finish can be damaged on coating lines, during transferring from production lines to storage, and during shipping and installation. A reasonable level of scratch resistance is also required to insure a low rejection rate of finish products.

Post-addition of silicone additives into paint formulations may improve scratch resistance of coating films obtained therefrom, but usually results in undesirably low clarity of the paint formulations in the wet or dry state. Many coating applications require coating compositions having high clarity in the wet state (e.g., a relative transparency value of at least 60) and a dry film clarity value of at least 55% to afford desirable aesthetic property. US2016/0244629A1 discloses an aqueous coating composition comprising an acrylic emulsion copolymer, colloidal silica, an alkyl silane, water, and scratch-resistant additives (e.g., TEGO Glide 410). However, the clarity of coating films made from such coating composition needs to be further increased.

Moreover, aqueous coating compositions in many applications such as in architectural and industrial coatings are required to have sufficient water resistance to meet industry requirements. In the wood coating industry, it is also desirable to provide coating films having high hardness (e.g., a pencil hardness of F or harder).

Therefore, it is desirable to provide an aqueous polymer dispersion useful as a binder that is able to provide coating films with desirable scratch resistance with balanced properties of high hardness, high clarity, and good water resistance.

SUMMARY OF THE INVENTION

The present invention provides a novel aqueous multistage polymer dispersion that is useful as binders in coating applications. A process for preparing the aqueous multistage polymer dispersion includes a multistage free-radical polymerization. Coating compositions comprising the aqueous multistage polymer dispersion of the present invention shows a high wet state clarity as indicated by a relative transparency of 60 or higher, and provides coating films with a scratch resistance rating of 5 as well as a pencil hardness of F or harder. The coating films may also demonstrate a dry film clarity value of at least 55%, even when the coating films have a low gloss level of 20-40 on a 60° Gardner Gloss scale, and/or a water resistance level of at least 3. These properties were measured according to the test methods described in the Examples section below.

In a first aspect, the present invention is an aqueous dispersion of a multistage polymer comprising a polymer A and a polymer B, wherein the polymer A has a number average molecular weight of from 3,000 to 50,000 and comprises as polymerized units, based on the weight of the polymer A, (a1) from 2.1% to 10% by weight of a carbonyl-containing functional monomer;

(a2) from 5% to 15% by weight of an acid monomer, a salt thereof, or mixtures thereof; and (a3) from 75% to 92% by weight of a hydrophilic (meth)acrylic acid alkyl ester; and wherein the polymer B comprises as polymerized units, based on the weight of the polymer B, (b1) from 0.8% to 10% by weight of a carbonyl-containing functional monomer;

(b2) from 0.2% to 2.5% by weight of a silicone monomer having the structure of formula II or III,

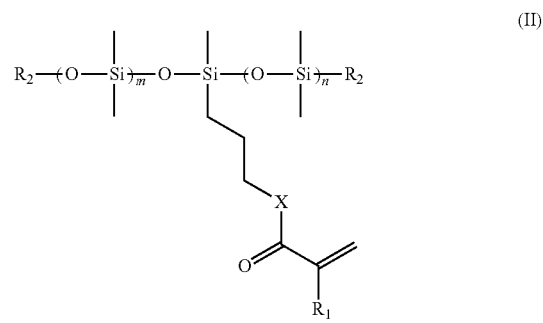

(II)

wherein X represents O or NH, $R_1$ represents a hydrogen atom or a methyl group, each $R_2$ independently represents a $C_1$-$C_{10}$ alkyl group, and m, n each independently represents an integer of from 1 to 100; or

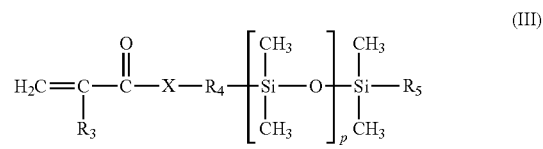

(III)

wherein X represents O or NH, $R_3$ represents a hydrogen atom or a methyl group, $R_4$ represents a $C_1$-$C_6$ bivalent hydrocarbon group, $R_5$ represents a $C_1$-$C_{10}$ alkyl group or a $C_1$-$C_{10}$ alkoxyl group, and p represents an integer of from 1 to 100; and (b3) from 87% to 99% by weight of an ethylenically unsaturated nonionic monomer;

wherein the polymer B has a glass transition temperature at least 40° C. lower than that of the polymer A and the weight ratio of the polymer A to the polymer B is from 38:62 to 55:45.

In a second aspect, the present invention is a process of preparing the aqueous dispersion of the first aspect by a multistage free-radical polymerization. The process comprises:

(i) preparing a polymer A in an aqueous medium by a free-radical polymerization in the presence of a chain transfer agent and neutralizing the obtained polymer A to a pH value of at least 6, wherein the polymer A having a number average molecular weight of from 3,000 to 50,000 comprises as polymerized units, based on the weight of the polymer A, (a1) from 2.1% to 10% by weight of a carbonyl-containing functional monomer;

(a2) from 5% to 15% by weight of an acid monomers, a salt thereof, or mixtures thereof; and (a3) from 75% to 92% by weight of a hydrophilic (meth) acrylic acid alkyl ester; and (ii) preparing a polymer B in the presence of the polymer A obtained from step (i) by a free-radical polymerization, wherein the polymer B comprises as polymerized units, based on the weight of the polymer B, (b1) from 0.8% to 10% by weight of a carbonyl-containing functional monomer; and (b2) from 0.2% to 2.5% by weight of a silicone monomer having the structure of formula II or III,

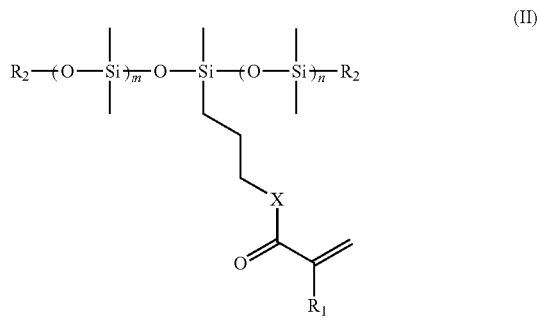

(II)

wherein X represents O or NH, $R_1$ represents a hydrogen atom or a methyl group, each $R_2$ independently represents a $C_1$-$C_{10}$ alkyl group, and m, n each independently represents an integer of from 1 to 100; or

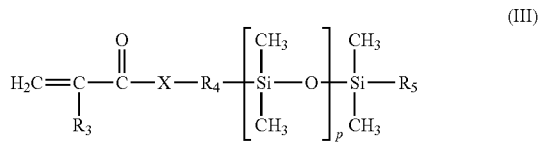

(III)

wherein X represents O or NH, $R_3$ represents a hydrogen atom or a methyl group, $R_4$ represents a $C_1$-$C_6$ bivalent hydrocarbon group, $R_5$ represents a $C_1$-$C_{10}$ alkyl group or a $C_1$-$C_{10}$ alkoxyl group, and p represents an integer of from 1 to 100; and (b3) from 87% to 99% by weight of an ethylenically unsaturated nonionic monomer;

wherein the polymer B has a glass transition temperature at least 40° C. lower than that of the polymer A, and the weight ratio of the polymer A to the polymer B is from 38:62 to 55:45.

In a third aspect, the present invention is an aqueous coating composition comprising the aqueous dispersion of the first aspect.

DETAILED DESCRIPTION OF THE INVENTION

"Wet state clarity" also known as "in-can clarity" means the clarity of an aqueous polymer dispersion in its wet state.

"Dry state clarity" also known as "dry film clarity" means the clarity of an aqueous polymer dispersion in its dry state.

"Hydrophilic" monomer in the present invention refers to a monomer that has a Hansch value<2.20, Hansch values may be determined by the method described by A. J. Leo in Chem. Rev., Volume 93, Issue No. 4, page 1281 (1993).

Glass transition temperature ($T_g$) values in the present invention are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(\text{calc.})} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of these homopolymers may be found, for example, in "Polymer Handbook", edited by J. Brandrup and E. H. Immergut, Interscience Publishers.

"Polymerized unit", also known as "structural unit", of the named monomer, refers to the remnant of the monomer after polymerization.

The multistage polymer in the aqueous dispersion of the present invention comprises a polymer A and a polymer B. The polymer A useful in the present invention may comprise, as polymerized units, (a1) one or more carbonyl-containing functional monomers. Examples of suitable carbonyl-containing functional monomers include diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, vinyl acetoacetates, acetoacetamides of Formula (I):

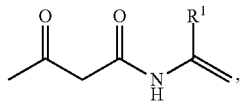

wherein $R^1$ is H or methyl, or combinations thereof. Preferred carbonyl-containing functional monomer is an ethylenically unsaturated monomer bearing a carbonyl group such as DAAM or acetoacetoxyethyl (meth)acrylate. The carbonyl-containing functional monomer may be used as a self-crosslinking agent. The polymer A may comprise, based on the weight of the polymer A, 2.1% by weight or more, 2.5% by weight or more, 3% by weight or more, or even 4% by weight or more, and at the same time, 10% by weight or less, 8% by weight or less, or even 6% by weight or less, of polymerized units of the carbonyl-containing functional monomer. "Weight of the polymer A" refers to the dry or solids weight of the polymer A.

The polymer A useful in the present invention may also comprise, as polymerized units, (a2) one or more acid monomers, salts thereof, or mixtures thereof. The acid monomers and their salts may include α, β-ethylenically unsaturated carboxylic acids including, for example, an acid-bearing monomer or a monomer bearing an acid-forming group which yields or is subsequently convertible to, such an acid group (such as anhydride, (meth)acrylic anhydride, or maleic anhydride); or mixtures thereof; sodium styrene sulfonate (SSS); sodium vinyl sulfonate (SVS); acrylamido-2-methylpropanesulfonic acid (AMPS); phosphorous-containing acid monomers including phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_pO)_n-P(O)(OH)_2$, wherein R=H or $CH_3$ and $R_p$=alkyl, such as SIPOMER PAM-100, SIPOMER PAM-200, and SIPOMER PAM-300 all available from Solvay; phosphoalkoxy (meth)acrylates such as phospho ethylene glycol (meth)acrylate, phospho diethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are dihydrogen phosphate monomers, which include 2-phosphoethyl (meth)acrylate, 2-phosphopropyl (meth)acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof. In one embodiment, the acid monomer is an α, β-ethylenically unsaturated carboxylic acid. Preferred acid monomers include acrylic acid, methyl acrylic acid, crotonic acid, acyloxypropionic acid, maleic acid, fumaric acid, itaconic acid, or mixtures thereof. The polymer A may comprise, based on the weight of the polymer A, 5% by weight or more, 7% by weight or more, 8% by weight or more, or even 9% by weight or more, and at the same time, 15% by weight or less, 14% by weight or less, 13% by weight or less, or even 12% by weight or less, of polymerized units of the acid monomer, salts thereof, or mixtures thereof.

The polymer A useful in the present invention may further comprise, as polymerized units, (a3) one or more hydrophilic (meth)acrylic acid alkyl esters. The hydrophilic (meth)acrylic acid alkyl ester may be a (meth)acrylic acid alkyl ester having a $C_1$ to $C_2$ alkyl group. Examples of suitable hydrophilic (meth)acrylic acid alkyl esters include methyl (meth)acrylate, ethyl (meth)acrylate, or mixtures thereof. Preferred hydrophilic (meth)acrylic acid alkyl esters are methyl methacrylate, ethyl acrylate, or mixtures thereof. The polymer A may comprise, based on the weight of the polymer A, 75% by weight or more, 80% by weight or more, or even 86% by weight or more, and at the same time, 92% by weight or less, or even 90% by weight or less, of polymerized units of the hydrophilic (meth)acrylic acid alkyl ester.

The polymer A in the multistage polymer may have a $T_g$ of from 60 to 120° C. or from 70° C. to 120° C. The polymer A in the multistage polymer may have a number average molecular weight ($M_n$) of 3,000 or more, 4,500 or more, or even 5,000 or more, and at the same time, 50,000 or less, 30,000 or less, 20,000 or less, or even 10,000 or less. $M_n$ may be determined by Gel Permeation Chromatography (GPC) analysis using polystyrene as the standard or calculated as follows, $$Mn=[W(monomer)+W(CTA)]/Mole(CTA),$$

wherein W(monomer) is the total weight of monomers used in preparing the polymer A, W(CTA) is the weight of a chain transfer agent used in preparing the polymer A, and Mole(CTA) is the moles of the chain transfer agent used in preparing the polymer A.

The multistage polymer in the aqueous dispersion of the present invention also comprises a polymer B. The polymer B may comprise, as polymerized units, (b1) one or more carbonyl-containing functional monomers. Examples of suitable carbonyl-containing functional monomers (b1) include those carbonyl-containing functional monomers (a1) as described in the polymer A section above. The carbonyl-containing functional monomer (b1) in preparing the polymer B may be the same as, or different from the carbonyl-containing functional monomer (a1) used in preparing the polymer A. Preferably, DAAM, acetoacetoxyethyl (meth)acrylate, or a mixture thereof is used as the carbonyl-containing functional monomer (b1). The polymer B may comprise, based on the weight of the polymer B, 0.8% by weight or more, 1.5% by weight or more, or even 2.0% by weight or more, and at the same time, 10% by weight or less, 8% by weight or less, or even 6% by weight or less, of polymerized units of the carbonyl-containing functional monomers.

The polymer B useful in the present invention may also comprise, as polymerized units, (b2) one or more silicone monomers. The silicone monomers are usually ethylenically unsaturated silicone monomers. The silicone monomer may have the structure of formula (II) or (III). The formula (I) represents the following structure,

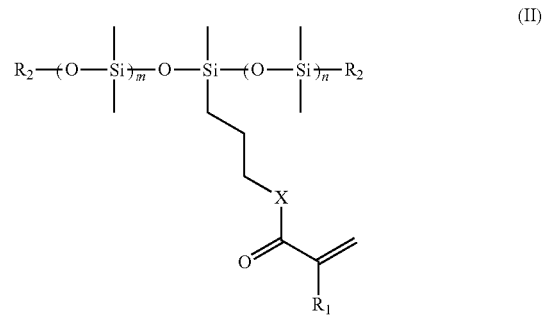

(II)

wherein, in formula (II), X represents O or NH, preferably O; $R_1$ represents a hydrogen atom or a methyl group; each $R_2$ independently represents a $C_1$-$C_{10}$ alkyl group, preferably a $C_1$-$C_6$ alkyl group, and more preferably a $C_1$-$C_3$ alkyl group; and m, n each independently represents an integer of from 1 to 100, preferably from 10 to 40, and more preferably from 20 to 30.

The formula (III) represents the following structure,

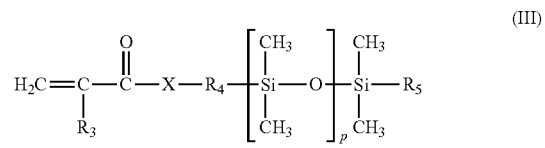

(III)

wherein, in formula (III), X represents O or NH, preferably O; $R_3$ represents a hydrogen atom or a methyl group; $R_4$ represents a $C_1$-$C_6$ bivalent hydrocarbon group; $R_5$ represents a $C_1$-$C_{10}$ alkyl group or a $C_1$-$C_{10}$ alkoxyl group, preferably a $C_1$-$C_6$ alkyl or alkoxyl group, and more preferably a $C_1$-$C_3$ alkyl or alkoxyl group; and p represents an integer of from 1 to 100, preferably from 5 to 80, and more preferably from 10 to 60.

In one embodiment, the silicone monomer used for preparing the polymer B has the structure of formula (II), wherein X is O, $R_1$ is a methyl group, $R_2$ is a methyl group, and m, n each independently is an integer of from 20 to 30 and preferably 25.

Suitable commercially available silicone monomers include DOW CORNING 32 mono-functional siloxane additive available from Dow Corning, COATOSIL 3509 acrylated siloxane polyalkyleneoxide copolymer available from Momentive Performance Materials Inc., or mixtures thereof. The polymer B may comprise, based on the weight of the polymer B, 0.2% by weight or more, 0.25% by weight or more, 0.3% by weight or more, 0.35% by weight or more, or even 0.4% by weight or more, and at the same time, 2.5% by weight or less, 2.2% by weight or less, 2.0% by weight or less, or even 1.5% by weight or less, of polymerized units of the silicone monomer.

The polymer B useful in the present invention may also comprise, as polymerized units, (b3) one or more ethylenically unsaturated nonionic monomers that exclude the carbonyl-containing functional monomers. The ethylenically unsaturated nonionic monomer can be a vinyl aromatic monomer, a (meth)acrylic acid alkyl ester, or a mixture thereof. Examples of suitable ethylenically unsaturated nonionic monomers include styrene or substituted styrene, butyl (meth)acrylate, iso-butyl (meth)acrylate, tert-butyl (meth)acrylate, 2-ethylhexyl acrylate, lauryl (meth)acrylate, stearyl (meth)acrylate, methyl (meth)acrylate, ethyl (meth)acrylate, or mixtures thereof. Preferred ethylenically unsaturated nonionic monomers are 2-ethylhexyl acrylate, butyl (meth)acrylate, methyl (meth)acrylate, or mixtures thereof. The polymer B may comprise, based on the weight of the polymer B, 87% by weight or more, 90% by weight or more, or even 92% by weight or more, and at the same time, 99% by weight or less or 96% by weight or less, of polymerized units of the ethylenically unsaturated nonionic monomer.

The polymer B in the multistage polymer may have a $T_g$ at least 40° C. lower than that of the polymer A, for example, the polymer B may have a $T_g$ of −20° C. or higher, from −15° C. to 60° C., or from −10° C. to 40° C. The weight ratio of polymer A to polymer B may be in the range of from 38:62 to 55:45, from 39:61 to 53:47, or from 40:60 to 50:50. The types and levels of the monomers described above may be chosen to provide the multistage polymer with a $T_g$ suitable for different applications. The $T_g$ of the multistage polymer may be in the range of from −30° C. to 70° C., from −20° C. to 60° C., or from −10° C. to 45° C.

In some preferred embodiments, the multistage polymer in the aqueous dispersion of the present invention comprises the polymer A which comprises as polymerized units, based on the weight of the polymer A, (a1) from 3% to 7% by weight of the carbonyl-containing functional monomer such as DAAM, acetoacetoxyethyl (meth)acrylate, or mixtures thereof; and (a2) from 7% to 13% by weight of the α, β-ethylenically unsaturated carboxylic acid such as (meth)acrylic acid, itacolic acid, fumaric acid, or mixtures thereof; and (a3) from 80% to 90% by weight of the hydrophilic (meth)acrylic acid alkyl ester such as methyl (meth)acrylate, ethyl (meth)acrylate, or mixtures thereof;

the polymer B which comprises as polymerized units, based on the weight of the polymer B, (b1) from 2.5% to 10% by weight of the carbonyl-containing functional monomer such as DAAM, acetoacetoxyethyl (meth)acrylate, or mixtures thereof;

(b2) from 0.3% to 2.3% by weight of the silicone monomer; and (b3) from 90% to 99% by weight of the ethylenically unsaturated nonionic monomer, such as styrene, 2-ethylhexyl acrylate, iso-butyl (meth)acrylate, butyl (meth)acrylate, methyl (meth)acrylate, or mixtures thereof.

In addition to the multistage polymer, the aqueous multistage polymer dispersion of the present invention may further comprise a polyfunctional carboxylic hydrazide containing at least two hydrazide groups per molecule. The polyfunctional carboxylic hydrazides may act as a crosslinker and may be selected from the group consisting of adipic dihydrazide, oxalic dihydrazide, isophthalic dihydrazide, and polyacrylic polyhydrazide. When present, the concentration of the polyfunctional carboxylic hydrazide may be from 0.5% to 10% by weight or from 1% to 5% by weight, based on the weight of the multistage polymer. "Weight of the multistage polymer" refers to the dry or solids weight of the multistage polymer.

The aqueous multistage polymer dispersion of the present invention further comprises water. The concentration of water may be, by weight based on the total weight of the aqueous dispersion, from 30% to 90% or from 40% to 80%. The aqueous multistage polymer dispersion may be useful in many applications including, for example, wood coatings, architecture coatings, and traffic paints.

The process of preparing the aqueous multistage polymer dispersion of the present invention includes a multistage free-radical polymerization process in which at least two stages are formed sequentially, which usually results in the formation of the multistage polymer comprising at least two polymer compositions such as the polymer A and the polymer B. The aqueous multistage polymer dispersion may be prepared by, first preparing the polymer A (e.g., in the first stage) followed by preparing the polymer B (e.g., in the second stage). Each stage of the free-radical polymerization can be conducted by polymerization techniques well known in the art such as suspension polymerization or emulsion polymerization of the monomers described above. Emulsion polymerization is a preferred process. For each monomer, types and concentration of the monomer based on the total weight of monomers used in preparing the polymer A or the polymer B is substantially the same as the types and concentration of polymerized units of such monomer based on the total weight of the polymer A or the polymer B, respectively. Total weight concentration of monomers for preparing the polymer A and the polymer B, respectively, is equal to 100%. A mixture of the monomers for preparing the polymer A or the polymer B, respectively, may be added neat or as an emulsion in water; or added in one or more additions or continuously, linearly or nonlinearly, over the reaction period, or combinations thereof. Temperature suitable for emulsion polymerization processes may be lower than 100° C., in the range of from 30 to 95° C., or in the range of from 50 to 90° C.

In the multistage free-radical polymerization process, free radical initiators may be used in each stage. The polymerization process may be thermally initiated or redox initiated emulsion polymerization in each stages. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process, a surfactant may be used for each stage. The surfactant may be added prior to or during the polymerization of the monomers, or combinations thereof. A portion of the surfactant can also be added after the polymerization. Surfactants may be used for both stages or only in the first stage of preparing the multistage polymer. In some embodiments, the polymer A obtained may act as a surfactant to emulsify the monomer mixture for preparing the polymer B. In some preferred embodiments, one portion of the polymer A is used as a surfactant to emulsify the monomer mixture used for preparing the polymer B and the other portion of the polymer A remains in the reactor. The total dosage of surfactants used in the multistage polymerization process of the present invention can be lower than that of surfactants used in conventional emulsion polymerization processes. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates are used. The combined amount of the surfactant used is usually from 0.1% to 6% by weight or from 0.3% to 1.5% by weight, based on the weight of total monomers used for preparing the multistage polymer.

In the multistage free-radical polymerization process, a train transfer agent may be used in the stage of preparing the polymer A. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the polymer A. For example, the chain transfer agent may be present in an amount of from 0.3% to 3% by weight, from 1% to 2.5% by weight, or from 1.5% to 2% by weight, based on the total weight of monomers used for preparing the polymer A.

In some embodiments, the process of preparing the aqueous multistage polymer dispersion includes preparing the polymer A in the presence of the chain transfer agent and neutralizing the obtained polymer A to a pH value of at least 6, from 6 to 10, or from 7 to 9; and then preparing the polymer B in the presence of the polymer A. The pH value of the obtained multistage polymer may be neutralized to be at least 7, for example, from 7 to 10 or from 8 to 9.

Neutralization in the process of preparing the aqueous multistage polymer dispersion may be conducted by using one or more bases as neutralizers. The bases may lead to partial or complete neutralization of the ionic or latently ionic groups of the polymer A or the multistage polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The process of preparing the aqueous multistage polymer dispersion may further comprise adding the polyfunctional carboxylic hydrazide containing at least two hydrazide groups per molecule described above into the obtained aqueous multistage polymer dispersion.

The present invention also relates to an aqueous coating composition comprising the aqueous multistage polymer dispersion described above. The aqueous multistage polymer dispersion in the aqueous coating composition may be present, by solids weight based on the total weight of the aqueous coating composition, in an amount of 10% or more, 13% or more, or even 15% or more, and at the same time, 30% or less, 28% or less, or even 25% or less.

The aqueous coating composition of the present invention may comprise one or more matting agents. "Matting agents" herein refer to any inorganic or organic particles that provide matt effect. Matting agents usually have an average particle size of 5.5 microns or more according to the ASTM E2651-10 method. The matting agents may be selected from silica matting agents, polyurea matting agents, polyacrylate, polyethylene, polytetrafluoroethene, or mixtures thereof. Suitable commercially available matting agents include, for example, ACEMATT TS-100 and ACEMATT OK520 silica matting agents both available from Evonik, DEUTERON MK polyurea matting agent available from Deuteron, micronized wax additives CERAFLOUR 929 and CERAFLOUR 920 both available from BYK, SYLOID Silica 7000 matting agent available from Grace Davison; or mixtures thereof. When present, the concentration of the matting agent may be, by solids weight based on the total weight of the aqueous coating composition, from 0.1% to 5%, from 0.5% to 4%, or from 0.5% to 3.5%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. When present, the concentration of the defoamer may be, by weight based on the total weight of the aqueous coating composition, generally from 0.01 to 2%, from 0.05 to 0.8%, or from 0.1 to 0.5%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. When present, the concentration of the thickener is, by weight based on the total weight of the aqueous coating composition, generally from 0.05% to 3%, from 0.1% to 2%, or from 0.3% to 1%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL 104 nonionic wetting agent based on an actacetylenic diol available from Air Products, BYK-346 and BYK-349 polyether-modified siloxanes both available from BYK, or mixtures thereof. The wetting agent may be present, based on the total weight of the aqueous coating composition, from 0 to 2.5% by weight, from 0.1% to 2% by weight, or from 0.3% to 1% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, from 0 to 10%, from 0.1% to 9%, or from 1% to 8%.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents), thixotropic agents, adhesion promoters, anti-scratch additives, and grind vehicles. When present, these additives may be present in a combined amount of from 0.001% to 10% by weight, or from 0.01% to 2% by weight, based on the total weight of the aqueous coating composition.

The aqueous coating composition of the present invention may be prepared with techniques known in the coating art. The process of preparing the aqueous coating composition of the present invention may comprise admixing the aqueous multistage polymer dispersion with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention shows high clarity in the wet state, as indicated by a relative transparency value of 60 or higher, 70 or higher, or even 75 or higher. The coating composition also provides the coating obtained therefrom, i.e., the coating film after drying the coating composition applied to a substrate, with good scratch resistance as indicated by a scratch resistance rating of 5. In some embodiments, the coating film also shows a pencil hardness of F or harder; a dry film clarity value of at least 55%, at least 60%, at least 62%, or at least 65% at a low gloss level of 20-40 on a 60° Gardner Gloss scale, and/or a water resistance level of at least 3 or at least 4. These properties are measured according to the test methods described in the Examples section below. A method of preparing the coating may comprise forming the aqueous coating composition of the present invention, applying the aqueous coating composition to a substrate, and drying the applied coating composition to form the coating.

A process of using the aqueous coating composition of the present invention may comprise the following: applying the aqueous coating composition to a substrate, and drying the applied coating composition. The aqueous coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition may be dried, or be allowed to dry, at 5-25° C., or at an elevated temperature, for example, from 35° C. to 60° C. to form a film (this is, coating).

The aqueous coating composition of the present invention can be applied to, and adhered to, various substrates. Examples of suitable substrates include wood, metals, plastics, foams, stones, elastomeric substrates, glass, fabrics, concrete, or cementious substrates. The coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for industrial coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The following materials are used in the examples:

2-ethylhexyl acrylate ("EHA"), butyl acrylate ("BA"), methacrylic acid ("MAA"), methyl methacrylate ("MMA"), ammonium persulfate ("APS"), tert-butyl hydroperoxide ("t-BHP"), isoascorbic acid ("IAA"), $Na_2CO_3$, and methyl 3-mercaptopropanoate ("MMP") are all available from Sinoreagent Group.

DOW CORNING 32 additive ("DC-32"), available from Dow Corning, is a mono-functional siloxane.

SILQUEST A-174 silane ("A-174"), available from Momentive Performance Materials Inc., is gamma-methacryloxypropyltrimethoxysilane.

Diacetone acrylamide ("DAAM") and adipic dihydrazide ("ADH") are both available from Kyowa Hakko Chemical Co., Ltd.

DISPONIL Fes 32 ("Fes-32") surfactant, available from BASF, is a fatty alcohol ether sulfate, sodium salt solution.

RHODAFAC RS-610-A25 ("RS-610-A25") surfactant, available from Solvay, is a phosphate ester, branched alcohol ethoxylate based ammonia salt.

BYK 346 wetting agent is available from BYK.

TEGO Airex 904 W defoamer is available from Evonik.

ACRYSOL RM-845W ("RM-845W") thickener is available from The Dow Chemical Company.

Ammonia (25%) is available from Sinopharm Chemical Reagent Co., Ltd.

DOWANOL™ DPM dipropyplene glycol methyl ether ("DPM") and DOWANOL DPnB dipropyplene glycol n-butyl ether ("DPnB") are both available from The Dow Chemical Company (DOWANOL is a trademark of The Dow Chemical Company).

ACEMATT ("TS 100") matting agent, available from Evonik, is an untreated thermal silica.

The following standard analytical equipment and methods are used in the Examples.

Water Resistance

Water resistance of coating films was determined by the BS EN 12720:2009 method. Panels were prepared by brush applying three coats at 80-90 g/m² over each type of wood (a black panel). After the first coat, panels were left at room temperature (23±2° C.) for four hours, and then sanded with sand paper. The second coating layer was then brushed onto the wood substrate and dried at room temperature for 4 hours. After applying the third coat, panels were allowed to dry at room temperature for 4 hours, and then placed in an oven at 50° C. for 48 hours before conducting the water resistance tests.

Disc type filter paper were first saturated with water, placed on the above finished panels, and covered with a cap to reduce evaporation. After 24 hours, the cap was removed. Test area was wiped with wet facial tissues and allowed to dry at room temperature to observe the degree of damage. The test area was then rated for damage degree on a scale of 0-5, where 0 is the worst, and 5 is the best. The water resistance rating being 3 or higher is acceptable. The higher the rating, the better the water resistance. Otherwise, the water resistance rating lower than 3 is unacceptable.

1: Strong change: the structure of surface being distinctly changed, and/or discoloration, change in gloss and color, and/or the surface being totally or partially removed, and/or the filter paper adhering to the surface;

2: Significant change: test area clearly distinguishable from adjacent surrounding area, visible in all viewing directions, e.g., discoloration, change in gloss and color, and/or structure of surface slightly changed, e.g., swelling, fiber raising, cracking and blister;

3: Moderate change: test area distinguishable from adjacent surrounding area, visible in all viewing directions, e.g., discoloration, change in gloss and color, and no change in structure of surface, e.g., swelling, fiber raising, cracking and blister;

4: Slight change: test area distinguishable from adjacent surrounding area, only when the light source is mirrored on the test surface and is reflected towards the observer's eyes, e.g., discoloration, change in gloss and color, and no change in structure of surface, e.g., swelling, fiber raising, cracking and blister;

5: No change: test area indistinguishable from adjacent surrounding area.

Wet State Clarity

The wet state clarity of a coating composition sample was evaluated by measuring the relative transparency of the sample.

A 24-well polystyrene cell culture cluster (4 columns and 6 rows, round well diameter: around 1 cm) was used for determining the relative transparency. The first row of the cell culture cluster was left blank. Wells in other rows were filled with test samples. Four wells in the same row of the cell culture cluster were filled with the same coating composition sample. The cell culture cluster was then scanned by Epson Perfection V500 scanner. The obtained scanned image was analyzed with ImageJ software and R, G, B values were obtained. Grey value was then calculated from R, G and B values according to Equation 1, $$\text{Grey value} = \tfrac{1}{3}R + \tfrac{1}{3}G + \tfrac{1}{3}B \qquad \text{Equation 1}$$

The grey value is an indicator of the opacity of test samples. Higher grey value indicates higher opacity, thus lower wet state clarity. The average grey value of blank wells in the first row was recorded as G1 and the average grey value of four samples for each coating composition was recorded as G2. The blank wells were considered as 100% transparent and the average grey value was used as a baseline. The relative transparency of the sample can be calculated by the following Equation 2, $$\text{Relative transparency} = \frac{G2 - G1}{255 - G1} \times \frac{1}{100} \qquad \text{Equation 2}$$

A relative transparency value of being 60 or higher indicates high wet state clarity. The higher the relative transparency, the higher the wet state clarity. Otherwise, the relative transparency value lower than 60 indicates unacceptable wet state clarity.

Dry Film Clarity

A coating composition was coated on a glass plate to form a 120 μm thick wet film using a drawdown applicator. The obtained panel was then cured in an oven at 50° C. for 48 hours. A BYK haze-gard dual haze meter was used to evaluate the clarity of the resultant coating film on the panels and provided transmittance and haze values. Clarity is calculated using the following equation:

$$\text{Clarity} = \text{Transmittance} \times (1 - \text{Haze})$$

The clarity of the glass plate before applying the coating composition is denoted as $C_{glass}$. The clarity of the obtained panel coated with the coating film is denoted as $C_{glass+film}$. Then the clarity of the coating film ($C_{film}$) is measured according to the following equation:

$$C_{film} = (C_{glass+film} / C_{glass}) \times 100\%$$

A $C_{film}$ value of at least 55% was acceptable clarity for wood coatings. The higher the $C_{film}$ value, the better the clarity of the coating film.

Pencil Hardness

The pencil hardness of a coating film was measured according to the ASTM D3363-05 method. A coating composition was applied on a glass panel to form a 120 μm thick wet film and cured at room temperature for 7 days. The resultant film was then tested by a Zhonghua pencil. The hardness of the pencil used is: 9H, 8H, 7H, 6H, 5H, 4H, 3H, 2H, H, F, HB, B, 2B, 3B, 4B, 5B, 6B, where 9H is the hardest, 6B is the softest. Pencil hardness of F or harder is acceptable.

Scratch Resistance

A coating composition was applied on a glass panel to form a 120 μm thick wet film and cured at room temperature for 7 days. Scratch resistance of the obtained coating film was tested by using 5750 Linear Abraser with a testing bar loaded with 5 kg weight. A 3M scouring pad was cut to a 1.2 mm×1.2 mm square having two sides at different grades of coarseness. The more coarse side of the scouring pad was stuck to the bottom of the testing bar by using a double faced adhesive tape. Then the less coarse side of the scouring pad contacted the coating film on the glass and rubbed the surface of the coating film for 30 cycles. The test surface was then observed and rated by failure area damaged by the scouring pad on a scale of 0-5. Rating for scratch resistance after 30 cycles being 5 means good scratch resistance. Otherwise, scratch resistance rating lower than 5 means unacceptable scratch resistance.

5—No failure
  4—0<area failure≤20%
  3—20<area failure≤50%
  2—50<area failure≤80%
  1—80<area failure≤100%

GPC Analysis

GPC analysis was performed generally by Agilent 1200. A sample was dissolved in tetrahydrofuran (THF)/formic acid (FA)(5%) with a concentration of 2 mg/mL and then filtered through 0.45 μm polytetrafluoroethylene (PTFE) filter prior to GPC analysis. The GPC analysis is conducted using the following conditions:

Column: One PLgel GUARD columns (10 m, 50 mm×7.5 mm), One Mixed B columns (7.8 mm×300 mm) in tandem, 73 #; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene Narrow standards with molecular weights ranging from 2329000 to 580 g/mol, using polynom 3 fitness.

Example (Ex) 1 Aqueous Multistage Polymer Dispersion ("MP-1")

Preparation of Monomer Emulsion 1: Fes-32 surfactant (7.44 grams (g), 31.00% active) was dissolved in deionized (DI) water (162.54 g) with stirring. Then MMA (344.2 g), DAAM (29.04 g), MAA (41.47 g), and MMP (8.17 g) were added into the resultant surfactant solution to obtain Monomer Emulsion 1.

Preparation of Monomer Emulsion 2: RS-610-A25 surfactant (4.79 g, 24.00% active) was dissolved in DI water (166 g) with stirring. Then EHA (236.39 g), BA (55.99 g), MMA (304.82 g), DC-32 (6.22 g), and DAAM (18.66 g) were added into the resultant surfactant solution to obtain Monomer Emulsion 2.

A solution containing Fes-32 surfactant (12.40 g, 31.00% active) and DI water (732.27 g) was added into a 4-neck, 3-liter round bottom flask equipped with a thermocouple, a cooling condenser and an agitator, and was heated to 85° C. under nitrogen atmosphere. An aqueous APS initiator solution (2.01 g of APS in 38.07 g of DI water), and 3.8% by weight of Monomer Emulsion 1 obtained above were then added into the flask. Within about 5 minutes, initiation of polymerization was confirmed by a temperature increase by 3-6° C. and a change of the external appearance of the reaction mixture. After heat generation stopped, the aqueous $Na_2CO_3$ solution (0.83 g of $Na_2CO_3$ in 20.0 g of DI water) was charged into flask. And then the remaining Monomer Emulsion 1 was added gradually to the flask over a period of 40 minutes with stirring. At the same time, an aqueous APS initiator solution (1.27 g of APS in 60.23 g of DI water) was added gradually to the flask over a period of 50 minutes. And the temperature was maintained at 84-86° C. After the APS initiator was consumed, gradually added 32.43 g of ammonia (25% active) into the flask over 15 minutes. Then the reaction mixture was held at 84° C. for 30 minutes.

Monomer Emulsion 2 obtained above was then added into the flask in the same manner as Monomer Emulsion 1 over 60 minutes. Then an aqueous APS initiator solution (1.52 g of APS in 72.28 g of DI water) was added gradually to the flask over a period of 60 minutes. Upon completing addition, the reaction mixture was held at 70° C. for 10 minutes. A water solution of t-BHP (21 g, 3.33% active) and IAA (20.52 g, 2.49% active) was then fed into the flask over 30 minutes followed by cooling to 40° C. Then ADH slurry (30 g in 56.00 g DI water) was added at 40° C. over 10 minutes and rinsed by 14 g DI water and then held for 20 minutes. The resulting dispersion was cooled to room temperature and filtered to obtain the aqueous polymer dispersion with 40% solids.

Synthesis of Aqueous Multistage Polymer Dispersions of MP-2 Through 5

These aqueous multistage polymer dispersions were prepared, respectively, according to the same procedure as described above for preparing the aqueous multistage polymer dispersion of MP-1 above, based on monomer formulations and the dosage of ADH given in Table 1.

Synthesis of Aqueous Multistage Polymer Dispersions of MP-A Through G

These aqueous multistage polymer dispersions were prepared, respectively, according to the same procedure as described above for preparing the aqueous multistage polymer dispersion of MP-1 above, based on monomer formulations and the dosage of ADH given in Table 2.

Properties of the obtained aqueous multistage polymer dispersions are given in Table 3.

TABLE 1

| | | Aqueous Multistage Polymer Dispersion | | | | |
|---|---|---|---|---|---|---|
| | | MP-1 | MP-2 | MP-3 | MP-4 | MP-5 |
| Monomers for the polymer A | MMA (g) | 344.21 | 344.21 | 344.21 | 358.73 | 430.26 |
| | MAA (g) | 41.47 | 41.47 | 41.47 | 41.47 | 51.84 |
| | DAAM (g) | 29.04 | 29.04 | 29.04 | 14.52 | 36.30 |
| | MMP (g) | 8.17 | 8.17 | 8.17 | 8.17 | 10.21 |
| $T_g$ of the polymer A (° C.) | | 111.7 | 111.7 | 111.7 | 111.7 | 111.7 |
| Monomers for the polymer B | MMA (g) | 304.82 | 298.60 | 307.93 | 304.82 | 201.37 |
| | BA (g) | 55.99 | 55.99 | 55.99 | 55.99 | 97.07 |
| | EHA (g) | 236.39 | 236.39 | 236.39 | 236.39 | 196.20 |
| | DAAM (g) | 18.66 | 18.66 | 18.66 | 18.66 | 15.49 |
| | DC-32 (g) | 6.22 | 12.44 | 3.11 | 6.22 | 6.20 |
| $T_g$ of the polymer B (° C.) | | −6.7 | −6.7 | −6.7 | −6.7 | −24.39 |
| Post added ADH (g) | | 30 | 30 | 30 | 20.90 | 30 |

TABLE 2

Aqueous Multistage Polymer Dispersions

|  |  | MP-A | MP-B | MP-C | MP-D | MP-E | MP-F | MP-G |
|---|---|---|---|---|---|---|---|---|
| Monomers for the polymer A | MMA (g) | 340.07 | 344.21 | 344.21 | 331.77 | 344.21 | 323.56 | 516.32 |
|  | MAA (g) | 41.47 | 41.47 | 41.47 | 41.47 | 41.47 | 38.98 | 62.21 |
|  | DC-32 (g) | 4.14 | 0 | 0 | 12.44 | 0 | 0 | 0 |
|  | DAAM (g) | 29.04 | 29.04 | 29.04 | 29.04 | 29.04 | 27.30 | 43.56 |
|  | MMP (g) | 8.17 | 8.17 | 8.17 | 8.17 | 8.17 | 7.68 | 12.26 |
| $T_g$ of the polymer A (° C.) |  | 111.7 | 111.7 | 111.7 | 111.7 | 111.7 | 111.7 | 111.7 |
| Monomers for the polymer B | MMA (g) | 311.04 | 304.82 | 311.04 | 311.00 | 292.38 | 336.69 | 97.46 |
|  | BA (g) | 55.99 | 55.99 | 55.99 | 55.99 | 55.99 | 38.82 | 95.39 |
|  | EHA (g) | 236.39 | 236.39 | 236.39 | 236.39 | 236.39 | 245.85 | 203.21 |
|  | DAAM (g) | 18.66 | 18.66 | 18.66 | 18.66 | 18.66 | 19.41 | 12.44 |
|  | DC-32 (g) | 0 | 0 | 0 | 0 | 18.66 | 6.21 | 6.22 |
|  | A-174 (g) | 0 | 6.22 | 0 | 0 | 0 | 0 | 0 |
| $T_g$ of the polymer B (° C.) |  | −6.7 | −6.7 | −6.7 | −6.7 | −6.7 | −8.2 | −45.6 |
| Post added ADH (g) |  | 30 | 30 | 30 | 30 | 30 | 30 | 30 |

TABLE 3

| Binder | pH | Solids (%) | Viscosity[3] (cps) | PS[4] (nm) | $M_n$ of polymer A |
|---|---|---|---|---|---|
| MP-A | 8.09 | 39.87 | 177 | 59 | 6100[1] |
| MP-1 | 8.02 | 39.93 | 195 | 58 | 6100[1] |
| MP-B | 7.87 | 39.84 | 210 | 54 | 6100[1] |
| MP-2 | 7.85 | 39.98 | 147 | 57 | 6100[1] |
| MP-3 | 7.96 | 39.76 | 141 | 56 | 6100[1] |
| MP-4 | 7.98 | 39.49 | 69 | 51 | 6725[2] (PDI: 2.25) |
| MP-C | 8.16 | 39.9 | 167 | 62 | 6100[1] |
| MP-5 | 8.3 | 39.33 | 1876 | 68 | 6803[2] (PDI: 2.29) |
| MP-D | 8.21 | 39.73 | 155 | 55 | 6100[1] |
| MP-E | 8.07 | 39.49 | 133 | 57 | 6100[1] |
| MP-F | 8.3 | 39.63 | 124 | 51 | 6100[1] |
| MP-G | 8.3 | 38.39 | 8038 | 70 | 6100[1] |

[1]$M_n$ calculated by Mn = [W(monomer) + W(CTA)]/Mole(CTA) described abov;
[2]$M_n$ and PDI (Polydispersity Index) = $M_w/M_n$, measured by the GPC analysis described above;
[3]Viscosity measured by Brookfield viscometer DV-I Primer (60 rpm, spindle 2#);
[4]PS refers to particle size measured by Brookhaven BI-90 Particle Size Analyzer.

Examples (Exs) 1-5 and Comparative (Comp) Exs A-G Coating Compositions

The aqueous multistage polymer dispersions obtained above were used as binders in preparing the coating compositions, based on formulations described in Table 4. The ingredients listed in Table 4 were mixed using a conventional lab mixer. The obtained coating compositions were evaluated according to the test methods described above. Properties of the coating compositions and coating films obtained therefrom are shown in Table 5.

TABLE 4

| Coating Composition | Gram |
|---|---|
| Binder | 60.80 |
| Water | 17.84 |

TABLE 4-continued

| Coating Composition | Gram |
|---|---|
| DPnB | 3.70 |
| DPM | 3.30 |
| BYK 346 | 0.50 |
| TS 100 | 1.00 |
| TEGO Airex 904 W | 0.10 |
| RM-845W | 1.50 |

As shown in Table 5, binder MP-A comprising polymerized units of the silicone monomer only in the polymer A (in an amount of 1% by weight of the polymer A) provided coating films with poor scratch resistance (Comp Ex A). Binder MP-B comprising polymerized units of vinyl silane (A-174) provided coating films with poor scratch resistance (Comp Ex B). Binder MP-C comprising no polymerized units of the silicone monomer provided coatings with poor scratch resistance (Comp Ex C). Binder MP-D comprising polymerized units of the silicone monomer only in the polymer A (in an amount of 3% by weight of the polymer A) provided undesirably low dry film clarity (Comp Ex D). Binder MP-E comprising polymerized units of the silicone monomer in the polymer B in an amount of 3% by weight of the polymer B provided coating films with undesirably low dry film clarity ($C_{film}$:32.45%, Comp Ex E). Binders MP-F and MP-G having the stage ratio of polymer A/polymer B of 37.5:62.5 and 60:40, respectively, both provided coating films with poor scratch resistance (Comp Exs F and G). In addition, the coating film of Comp Ex G was too soft to meet the pencil hardness requirement.

In contrast, the aqueous coating compositions of the present invention (Exs 1-5) all provided coating films with surprisingly good scratch resistance while having high pencil hardness, good water resistance and high clarity both in the wet and dry state.

TABLE 5

|  | Binder | Wet state clarity | Dry film clarity ($C_{film}$), % | Gloss[1] | Pencil hardness | Water resistance | Scratch resistance |
|---|---|---|---|---|---|---|---|
| Comp Ex A | MP-A | 77.68 | 60.62 | 30 | F | 4 | 4 |
| Ex 1 | MP-1 | 78.65 | 60.14 | 33 | H | 4 | 5 |
| Comp Ex B | MP-B | 81.59 | 62.7 | 28.6 | F | 3 | 4 |
| Ex 2 | MP-2 | 78.65 | 57.31 | 24.9 | F | 3 | 5 |

TABLE 5-continued

| | Binder | Wet state clarity | Dry film clarity ($C_{film}$), % | Gloss[1] | Pencil hardness | Water resistance | Scratch resistance |
|---|---|---|---|---|---|---|---|
| Ex 3 | MP-3 | 77.22 | 59.84 | 26.8 | 2H | 3 | 5 |
| Ex 4 | MP-4 | 77.28 | 62.58 | 31.4 | H | 3 | 5 |
| Comp Ex C | MP-C | N/A | N/A | 35.7 | N/A | N/A | 2+ |
| Ex 5 | MP-5 | 83.2 | 65.21 | 33.1 | F | 5 | 5 |
| Comp Ex D | MP-D | 68.7 | 26.12 | 27.5 | F | 5 | 4 |
| Comp Ex E | MP-E | 72.5 | 32.45 | 26.5 | F | 5 | 5 |
| Comp Ex F | MP-F | 70.9 | 58.94 | 28.7 | F | 5 | 4 |
| Comp Ex G | MP-G | 80.4 | 57.86 | 30.7 | HB | 5 | 4 |

[1]Gloss refers to 60° gloss on a glass as measured by ASTM D523 using a BYK Micro-Tri-Gloss meter.

What is claimed is:

1. An aqueous dispersion of a multistage polymer comprising a polymer A and a polymer B,
   wherein the polymer A has a number average molecular weight of from 3,000 to 50,000 and comprises as polymerized units, based on the weight of the polymer A,
   (a1) from 2.1% to 10% by weight of a carbonyl-containing functional monomer;
   (a2) from 5% to 15% by weight of an acid monomer, a salt thereof, or mixtures thereof; and
   (a3) from 75% to 92% by weight of a hydrophilic (meth)acrylic acid alkyl ester; and
   wherein the polymer B comprises as polymerized units, based on the weight of the polymer B,
   (b1) from 0.8% to 10% by weight of a carbonyl-containing functional monomer;
   (b2) from 0.2% to 2.5% by weight of a silicone monomer having the structure of formula II,

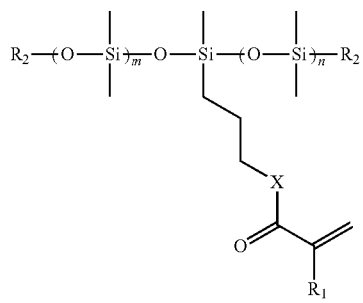

(II)

wherein X represents O or NH, $R_1$ represents a hydrogen atom or a methyl group, each $R_2$ independently represents a $C_1$-$C_{10}$ alkyl group, and m, n each independently represents an integer of from 1 to 100;
   (b3) from 87% to 99% by weight of an ethylenically unsaturated nonionic monomer;
   wherein the polymer B has a glass transition temperature at least 40° C. lower than that of the polymer A, and the weight ratio of the polymer A to the polymer B is from 38:62 to 55:45.

2. The aqueous dispersion of claim 1, wherein the carbonyl-containing functional monomers (a1) and (b1) are each independently diacetone acrylamide.

3. The aqueous dispersion of claim 1, further comprising from 0.5% to 10% by weight of a polyfunctional carboxylic hydrazide containing at least two hydrazide groups per molecule, based on the weight of the multistage polymer.

4. The aqueous dispersion of claim 3, wherein the polyfunctional carboxylic hydrazide is selected from the group consisting of adipic dihydrazide, oxalic dihydrazide, isophthalic dihydrazide, and polyacrylic polyhydrazide.

5. The aqueous dispersion of claim 1, wherein the silicone monomer has the structure of formula (II), wherein X is O, $R_1$ is a methyl group, each $R_2$ is a methyl group, and m, n each independently represents an integer of from 20 to 30.

6. The aqueous dispersion of claim 1, wherein the acid monomer is selected from the group consisting of (meth)acrylic acid, itaconic acid, fumaric acid, and phosphoethyl (meth)acrylate.

7. The aqueous dispersion of claim 1, wherein the hydrophilic (meth)acrylic acid alkyl ester is methyl (meth)acrylate, ethyl (meth)acrylate, or a mixture thereof.

8. The aqueous dispersion of claim 1, wherein the ethylenically unsaturated nonionic monomer is selected from the group consisting of styrene, 2-ethylhexyl acrylate, iso-butyl (meth)acrylate, butyl (meth)acrylate, and methyl (meth)acrylate.

9. The aqueous dispersion of claim 1, wherein the polymer A has a number average molecular weight of from 3,000 to 30,000.

10. The aqueous dispersion of claim 1, wherein the weight ratio of the polymer A to the polymer B is from 40:60 to 50:50.

11. The aqueous dispersion of claim 1, wherein the polymer A has a glass transition temperature of from 60 to 120° C. and the polymer B has a glass transition temperature of −20° C. or higher.

12. The aqueous dispersion of claim 1, wherein the polymer A comprises as polymerized units, based on the weight of the polymer A,
   (a1) from 3% to 7% by weight of the carbonyl-containing functional monomer;
   (a2) from 7% to 13% by weight of an α, β-ethylenically unsaturated carboxylic acid; and
   (a3) from 80% to 90% by weight of the hydrophilic (meth)acrylic acid alkyl ester; and
   wherein the polymer B comprises as polymerized units, based on the weight of the polymer B,
   (b1) from 2.5% to 10% by weight of the carbonyl-containing functional monomer;
   (b2) from 0.3% to 2.3% by weight of the silicone monomer;
   (b3) from 90% to 99% by weight of the ethylenically unsaturated nonionic monomer, wherein the ethylenically unsaturated nonionic monomer is selected from a vinyl aromatic monomer, a (meth)acrylic acid alkyl ester, or mixtures thereof.

13. An aqueous coating composition comprising the aqueous dispersion of claim 1.

14. The aqueous dispersion of claim 1, wherein (b2) the silicone monomer has the structure has the structure II, wherein X represents O, $R_1$ is a methyl group, each $R_2$ independently represents a $C_1$-$C_3$ alkyl group, and m, n each independently represents an integer of from 10 to 30.

15. A process of preparing an aqueous dispersion of a multistage polymer by a multistage free-radical polymerization, comprising:
(i) preparing a polymer A in an aqueous medium by a free-radical polymerization in the presence of a chain transfer agent and neutralizing the obtained polymer A to a pH value of at least 6, wherein the polymer A has a number average molecular weight of from 3,000 to 50,000 and comprises as polymerized units, based on the weight of the polymer A,
(a1) from 2.1% to 10% by weight of a carbonyl-containing functional monomer;
(a2) from 5% to 15% by weight of an acid monomers, a salt thereof, or mixtures thereof; and
(a3) from 75% to 92% by weight of a hydrophilic (meth) acrylic acid alkyl ester; and
(ii) preparing a polymer B in the presence of the polymer A obtained from step (i) by a free-radical polymerization, wherein the polymer B comprises as polymerized units, based on the weight of the polymer B,
(b1) from 0.8% to 10% by weight of a carbonyl-containing functional monomer; and
(b2) from 0.2% to 2.5% by weight of a silicone monomer having the structure of formula II,

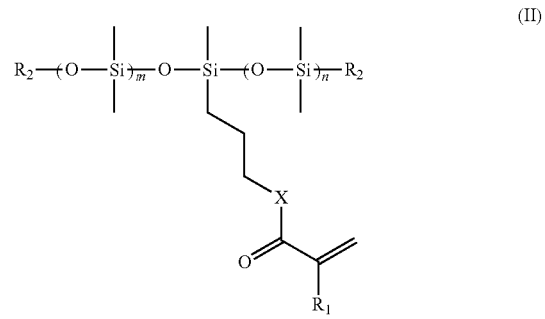

(II)

wherein X represents O or NH, $R_1$ represents a hydrogen atom or a methyl group, each $R_2$ independently represents a $C_1$-$C_{10}$ alkyl group, and m, n each independently represents an integer of from 1 to 100; or
(b3) from 87% to 99% by weight of an ethylenically unsaturated nonionic monomer;
wherein the polymer B has a glass transition temperature at least 40° C. lower than that of the polymer A, and the weight ratio of the polymer A to the polymer B is from 38:62 to 55:45.

* * * * *